Figure 1:
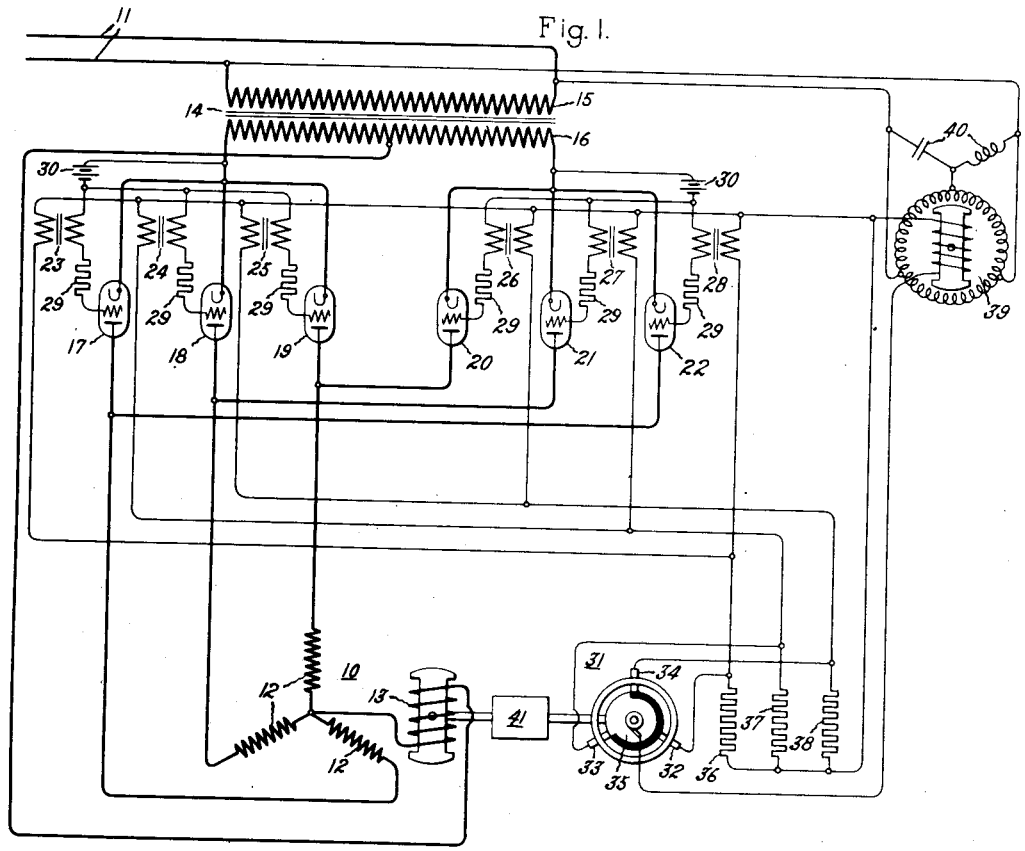

Feb. 23, 1937.  P. M. CURRIER  2,071,968

ELECTRIC VALVE CONVERTING SYSTEM

Filed Dec. 16, 1933

Inventor:
Philip M. Currier,
by Harry E. Dunham
His Attorney.

Patented Feb. 23, 1937

2,071,968

UNITED STATES PATENT OFFICE 2,071,968

ELECTRIC VALVE CONVERTING SYSTEM

Philip M. Currier, Ballston Lake, N. Y., assignor to General Electric Company, a corporation of New York Application December 16, 1933, Serial No. 702,769

3 Claims. (Cl. 172—274)

My invention relates to electric valve converting systems and more particularly to such systems suitable for operating a motor at variable speed from a source of direct or alternating current.

Heretofore, there have been devised numerous electric valve converting systems for transmitting energy from a direct or alternating current supply circuit to an alternating current motor. In the majority of these arrangements it has been customary to provide a distributor mechanism driven by the motor and connected to render the several electric valves conductive in the proper sequence. The distributor mechanism may be of the conventional contact and segment type or of the induction type, in either of which cases the rotary member is driven by the motor and connected to render the several electric valves conductive in the proper sequence. The distributor mechanism may be of the conventional contact and segment type or of the induction type, in either of which cases the rotary member is driven by the motor and is associated with a plurality of stationary elements connected to control the excitation of the several electric valves. It has been found that, in arrangements of this kind, if the angular position of one of the elements of the distributor mechanism with respect to that of the corresponding motor element is adjusted for optimum operation and maximum power factor under starting and low speed conditions, commutation of the valves, which is effected by the supply voltage, is unsatisfactory at higher motor speeds. On the other hand, if the distributor is set for satisfactory commutation at higher speeds and heavier loads, under which conditions commutation may be effected by the counter-electromotive force of the motor, the motor will operate at unnecessarily low power factor and have a reduced output at lower speeds. It would, therefore, be highly desirable to automatically advance the relative phase position of an element of the distributor mechanism with respect to the corresponding motor element at higher speeds of the motor. My invention is directed to a system and apparatus for securing these results.

It is an object of my invention, therefore, to provide an improved electric valve converting system suitable for operating an alternating current motor from a source of direct or alternating current and including a distributor mechanism driven by the motor in which the phase position of the distributor mechanism is automatically varied in accordance with variations in speed of the motor to ensure optimum operating conditions at all speeds.

In accordance with one embodiment of my invention, an alternating current motor is connected for operation from a source of single phase alternating current through a plurality of electric valves interconnecting the several phase terminals of the motor with each of the terminals of the supply circuit. In order to render conductive the several electric valves in the proper sequence, a distributor mechanism of the conventional contact segment and brush type is connected to be driven by the motor, the stationary brushes being connected to control the excitation of the control electrodes of the several electric valves. There is also provided a centrifugal mechanism driven by the motor, and therefore responsive to its speed, which is effective to vary the angular relationship of either the stationary or rotating elements of the distributor mechanism with respect to the corresponding motor parts; that is, the angular relationship between the rotating element of the distributor and the motor rotor or the angular relationship between the stationary brushes of the distributor and the motor stator. In the preferred embodiment, the position of the stationary elements of the distributor mechanism is advanced in accordance with an increase in speed of the motor to advance the cycle of operation of the several electric valves and thus secure optimum operating conditions of the motor.

For a better understanding of my invention, together with other and further objects thereof, reference is had to the following description taken in connection with the accompanying drawing and its scope will be pointed out in the appended claims. Referring to the drawing, Fig. 1 is a schematic representation of an electric valve converting system embodying my invention for operating a three phase alternating current supply circuit through a plurality of electric valves, while Fig. 2 illustrates a detail of the centrifugal mechanism for adjusting the phase relationship of the distributor mechanism.

Figure 2:
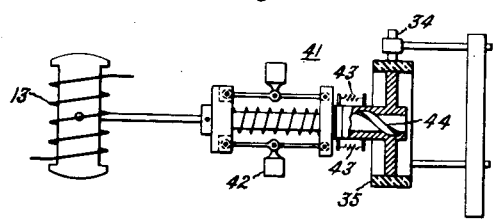

Referring now more particularly to Fig. 1 of the drawing, there is illustrated an arrangement for operating a three phase alternating current motor 10 from a single phase alternating current supply circuit 11. The motor 10 is preferably of the synchronous type, as illustrated, and comprises a three phase star connected armature winding 12 and a rotatable field or exciting winding 13. The armature winding 12 is connected to be energized from the alternating current supply circuit 11 through a transformer 14 comprising a primary winding 15 connected to the circuit 11 and a secondary winding 16 provided with an electrical midpoint. The several terminals of the armature winding 12 are connected to one side of the winding 16 through the electric valves 17—18—19 and to the other side of the winding 16 through electric valves 20—21—22, while the electrical neutral of the winding 16 is connected with the neutral of the armature winding 12 through the exciting winding 13. In case the motor 10 is of the induction type, this latter winding may be omitted or may comprise a separate reactance external to the motor 10. The electric valves 17–22 inc., are each provided with an anode, a cathode, and a control electrode, or grid, and may be of any of the several types well known in the art, although I prefer to use valves of the vapor or gaseous electric discharge type.

In order to control the several electric valves to supply unidirectional current successively to the several phase windings of the motor armature 12, their control electrodes are excited from the secondary windings associated grid transformers 23–28, inc., respectively, through current limiting resistors 29 and negative bias batteries 30. The primary windings of the grid transformers 23–28, inc., are energized from the alternating current circuit 11 through a distributor mechanism 31 which may be of the conventional stationary brush and rotating contact segment type, as illustrated, or of the induction type comprising a rotating inducing member and stationary induced members. In the type illustrated, the distributor mechanism 31 comprises a plurality of stationary brushes 32, 33 and 34 and a rotatable contact segment 35 driven by the motor 10. In order to provide stiff control circuits for the several electric valves, the primary windings of the transformers 23–28, inc., are energized with the potentials appearing across resistors 36, 37 and 38, which are successively energized through the brushes of the distributor 31 from the alternating current circuit 11.

In case it is desired to control the average voltage impressed upon the motor 10 for starting or for speed regulation, there may be provided means interposed between the circuit 11 and the distributor 31 for shifting the phase of the alternating potential applied to the resistors 36, 37 and 38. By way of example, I have illustrated a rotary phase shifting transformer 39 energized from the circuit 11 through a well known phase splitting circuit 40. In order to adjust the angular phase relation of one of the elements of the distributor mechanism in accordance with variations in the speed of the motor, there is interposed between the motor 10 and the distributor mechanism 31 a centrifugal mechanism 41 illustrated schematically in Fig. 1 and in detail in Fig. 2. This centrifugal mechanism comprises a conventional centrifugal fly-ball governor 42 connected through a resilient connection 43 with the rotary contact segment 35, which is mounted on the shaft of the motor 13 through a spiral spline 44, the effect being that, with the expansion of the centrifugal governor 42, the distributor segment 35 is moved axially along the shaft of the motor 10, which motion imparts to it an angular displacement with respect to the motor shaft.

In explaining the operation of the above described apparatus, it will be assumed that the alternating current circuit 11 is energized at any desired frequency, preferably a commercial frequency, that the rotary phase shifting transformer 39 is adjusted so that the alternating potential impressed upon the several grid circuits is retarded substantially with respect to that of the circuit 11, and that the rotary field winding 13 and distributor mechanism 31 are in approximately the positions illustrated. Under these conditions it will be seen that the primary windings of the grid transformers 24 and 27 are energized with the potentials across the resistor 37, and the associated valves 18 and 21, together with the transformer 14, act as a recifier to supply unidirectional current to the exciting winding 13 and the lower left-hand phase winding of the armature 12. At the same time the grid circuits of the other electric valves are deenergized at the distributor mechanism 31, except for the negative bias batteries 30 included in these circuits, so that these valves will be maintained non-conductive. The phase winding of the armature 12, which is excited as described above, is in torque producing position with respect to the exciting winding 13 and the motor begins to rotate and accelerate. When the motor has rotated through substantially 120 electrical degrees, the distributor mechanism 31 is effective to deenergize the transformers 24 and 27 and energize the transformers 23 and 28 to render valves 17 and 22 conductive to supply unidirectional current to the lower right-hand phase winding of the armature 12 and the exciting winding 13. In this manner, current is successively commutated between the several phase windings of the armature 12 in such a way that, at any particular instant, only that particular phase winding is energized which is in a torque producing position with respect to the motor rotor. By gradually advancing the position of the rotary phase shifting transformer 39 the average energization of the motor may be increased to accelerate it and its connected load to the desired speed.

As stated above, with an increase in the speed of the motor it is desirable to relatively advance the position of one of the elements of the distributor mechanism 31 with respect to its corresponding motor element. In the example illustrated, this is accomplished by the centrifugal mechanism 41, which upon increase in the speed of the motor, is effective to move the rotating contact segment 35 to the left (referring to Fig. 2 of the drawing) along the spiral spline with which it is connected to the motor shaft, thus producing an angular rotation which is in a proper direction to relatively advance the phase of the exciting potentials impressed upon the grids of the several electric valves.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. An electric power translating system comprising a source of current, an electric motor, means including a plurality of electric valves interconnecting said source and said motor to transmit energy therebetween, each of said valves being provided with a control electrode, a mechanism comprising a rotating element mounted on the motor shaft and a stationary element connected to excite the control electrodes of said valves, and means responsive to the speed of said motor for varying the angular phase relation between said rotating element and said motor shaft.

2. An electric power translating system comprising a source of current, an electric motor, means including a plurality of electric valves interconnecting said source and said motor to transmit energy therebetween, each of said valves being provided with a control electrode, a distributor mechanism comprising a rotating contact segment mounted on the motor shaft and a plurality of cooperating stationary brushes connected to excite the control electrodes of said valves, and means responsive to the speed of said motor for varying the angular phase relation between said contact segment and said motor shaft.

3. An electric power translating system comprising a source of current, an electric motor, means including a plurality of electric valves interconnecting said source and said motor to transmit energy therebetween, each of said valves being provided with a control electrode, a mechanism comprising a rotating element driven by said motor and a stationary element connected to excite the control electrodes of said valve, said rotating element being splined on the shaft of the said motor for axial and angular movement, and a centrifugal mechanism mounted on the shaft of said motor and connected to vary the angular position of said rotating element in accordance with the speed of said motor.

PHILIP M. CURRIER.